United States Patent [19]

Smith et al.

[11] 4,137,391

[45] Jan. 30, 1979

[54] CONTINUOUS SOLUTION POLYMERIZATION OF A CONJUGATED DIENE WITH A MONOVINYLAROMATIC COMPOUND USING ALKOXYSILICON TREATING AGENTS IN THE FIRST REACTOR MEANS OF A REACTOR SERIES

[75] Inventors: Richard L. Smith; Ralph C. Farrar, both of Bartlesville, Okla.

[73] Assignee: Phillips Petroleum Company, Bartlesville, Okla.

[21] Appl. No.: 722,253

[22] Filed: Sep. 10, 1976

[51] Int. Cl.$^2$ .................. C08F 4/48; C08F 4/56; C08F 4/58
[52] U.S. Cl. .................. 526/178; 260/880 R; 526/29; 526/46; 526/49; 526/55; 526/56; 526/65; 526/74; 526/174; 526/180; 526/181
[58] Field of Search .................. 526/178, 65, 74, 174, 526/179, 180, 181, 29, 48, 49; 260/880 R

[56] References Cited

U.S. PATENT DOCUMENTS

| | | | |
|---|---|---|---|
| 3,198,774 | 8/1965 | Aurtable et al. | 260/83.7 |
| 3,244,664 | 4/1966 | Zelinski et al. | 260/41.5 |
| 3,280,084 | 10/1966 | Zelinski et al. | 260/83.7 |
| 3,281,383 | 10/1966 | Zelinski et al. | 260/23.7 |
| 3,294,768 | 12/1966 | Wofford | 260/83.7 |
| 3,297,793 | 1/1967 | Dollinger | 260/879 |
| 3,356,763 | 12/1967 | Dollinger | 260/880 |
| 3,427,264 | 2/1969 | Foster et al. | 260/4 |
| 3,439,064 | 4/1969 | Makowski | 260/879 |
| 3,681,304 | 8/1972 | Johnson | 526/65 |
| 3,763,126 | 10/1973 | Farrar | 260/83.7 |
| 3,787,377 | 1/1974 | Halasa et al. | 260/83.7 |

FOREIGN PATENT DOCUMENTS 836667  6/1976  Belgium ............................. 526/176

Primary Examiner—William F. Hamrock

[57] ABSTRACT

Processable substantially random conjugated diene/monovinylaromatic compound copolymers are produced by continuous polymerization employing an alkoxysilicon treating agent in the first of a series of reactor means.

23 Claims, No Drawings

CONTINUOUS SOLUTION POLYMERIZATION OF A CONJUGATED DIENE WITH A MONOVINYLAROMATIC COMPOUND USING ALKOXYSILICON TREATING AGENTS IN THE FIRST REACTOR MEANS OF A REACTOR SERIES

FIELD OF THE INVENTION

The invention relates to easily processable random copolymers of a conjugated diene with a monovinylaromatic compound. In another aspect, the invention relates to the continuous random copolymerization of a conjugated diene with a monovinyl aromatic compound.

BACKGROUND OF THE INVENTION

Rubbers lacking the characteristic of good processability do not band well on roll mills, extrude at slower speeds, consume more power and generate more heat upon mixing with compounding ingredients, and the like. Such rubbers require handling on a small quantity basis, which increases labor costs and reduces capacity of processing equipment. Difficult-to-process rubbers require longer processing times and higher processing temperatures. Such conditions inherently are detrimental to the quality of the uncompounded rubber, and as well to the compounded rubber, since such rubbers exhibit greater shrinkage upon cooling, higher die swell, and present undesirable characteristics such as rougher extruded stocks and increased risk of scorch.

On the other hand, rubbers that possess the characteristics of good processability exhibit converse quality, and also just as conversely represent decreased requirements for labor, time and power. Readily processable rubbers are those in which good dispersions can be obtained of all of the compounding ingredients with a minimal potential need for remill operations or use of softeners or plasticizers. Such rubbers are millable under milder conditions with less opportunity for degradation. Improved processability means better compounded stocks at lower cost.

Furthermore, if easy-to-process rubbers can be obtained on a continuous basis, this represents even further opportunity for reduced costs. Polymerization procedures operated as a continuous rather than as a batch process provide for the more economic production of more uniform compositions. Many process variables can be readily adjusted by continuous operation to optimize operations for a given polymerization recipe.

BRIEF SUMMARY OF THE INVENTION

Heretofore, alkoxysilicon treating agents have been used at the end of polymerization as terminating agents. Unexpectedly, we have discovered an effective means of producing readily processable rubbers by a continuous polymerization process employing an alkoxysilicon treating agent as an additive in the first reactor means of a train or series of reactors. Thus, the alkoxysilicon compounds are employed as active components during the polymerization stage in the process of our invention. Our process results in readily processable solution-polymerized conjugated diene/monovinyl substituted aromatic compound substantially random rubbery copolymers. These polymers exhibit good nerve.

DETAILED DESCRIPTION OF THE INVENTION

The rubbers according to our invention comprise organolithium-initiated, solution-polymerized, conjugated diene/monovinylaromatic compound substantially random copolymers, produced under continuous polymerization conditions employing a train of reactor means operated in series employing an alkoxysilicon treating agent in the first of the reactors during the polymerization of the monomers in an amount effective to produce the processable rubbers.

The polymerization equipment comprises at least two reactor means operated as a reactor series or train, presently preferably three reactor means connected in series to provide two for polymerization and a third for termination. A minimum of two reactor means is employed in accordance with our process. The actual number of reactor means through which the polymerization reaction mixture flows in its progress of polymerization to final termination is not actually a limiting factor though we find that two reactor means for the polymerization stages, and the third or final unit for the termination or coupling or branching step, is a practical and convenient approach. Two reactor means in series give higher conversion than a single reactor. Three reactors would be expected to result in still higher conversion, though diminishingly so, and so on as still more reactor means are added. Manipulations become more complex as more reactor means are added, and our presently preferred 2 + 1 mode represents a practical balance.

The first reactor means receives the respective monomers including at least one polymerizable conjugated diene and at least one copolymerizable monovinylaromatic compound; polymerization diluent; organolithium initiator, preferably and conveniently supplied as a solution in a diluent which conveniently can be the same type of diluent as is employed as the polymerization diluent; a randomizer compound, also preferably and conveniently as a solution in a diluent again preferably and conveniently the same type as the polymerization diluent; and the alkoxysilane treating agent in accordance with our invention.

Each of the reactant materials and diluent being employed, together with the alkoxysilicon based treating agent, which is the further additive in accordance with our invention, preferably will have been previously purified as may be necessary in accordance with techniques known to the art. The several polymerization process components should be protected against moisture, air (oxygen), and stray terminating agents such as carbon dioxide, carbon monoxide, and the like. Where necessary, purification can be effected including steps such as distilling, treating with molecular sieves, and the like, as known to the art.

The several materials are fed to the first reactor means in the train or series wherein the reactor contents are maintained under suitable polymerization conditions of temperature and pressure for proper polymerization of the monomers, utilizing exterior or internal heating/cooling means, and pressurization methods as necessary such as with an inert gas such as nitrogen, and the like. Polymerization initiates in the first reactor means upon addition of the initiator and reaching suitable polymerization temperature and is allowed to proceed. The polymerization reaction admixture moves continuously or substantially continuously through the reactor train wherein the polymerization reaction is conducted in all but the last reactor. After a suitable average residence time so that polymerization of the monomers is substantially complete by the time the polymerization admixture reaches the last, for example the third reactor means, termination procedures then are applied to the reaction mixture. Termination can be simple inactivation of the active lithium; or by coupling with a difunctional treating agent to provide a linear polymer; or by coupling to result in branching by the use of a multifunctional treating agent such as a silicon tetrahalide. Thereafter, an antioxidant can be added if desired, and normal recovery procedures applied to recover the polymer for further processing, blending, compounding, and the like.

MONOMERS

The polymerization process in accordance with our invention is a random copolymerization of at least one polymerizable conjugated diene and at least one copolymerizable monovinylaromatic compound, with the term "polymerizable" referring to solution polymerizable monomers polymerizable with an organolithium initiator.

The polymerizable conjugated dienes generally contain 4 to 12 carbon atoms per molecule for convenience and availability, those containing 4 to 8 carbon atoms are preferred for commercial purposes, and presently most preferred for similar reasons are butadiene and isoprene. Examples include 1,3-butadiene and isoprene, as well as 2,3-dimethyl-1,3-butadiene, piperylene, 3-butyl-1,3-octadiene, 2-phenyl-1,3-butadiene, and the like, alone or in admixture. As suitable conjugated diene feedstocks, we can also employ mixtures of 1,3-butadiene, or other suitable conjugated dienes, in admixture with other low molecular weight hydrocarbons. Such admixtures, termed low concentration diene streams, are obtainable from a variety of refinery product streams such as naptha-cracking operations, or can be intentionally blended compositions, available from product streams produced in the modern complex oil refining and petrochemical plant sometimes termed a petrocomplexity. Low concentration diene streams may contain such as from less than 30 to more than 50 weight percent of 1,3-butadiene, though the concentration can range widely. Examples of typical low molecular weight hydrocarbons which may be admixed with 1,3-butadiene in the polymerization feed include such as propane, propylene, iso- and n-butane, 1,2-butadiene, 1-butene, isobutylene, trans-2-butene, cis-2-butene, vinylacetylene, cyclohexane, and the like.

Monovinyl-substituted aromatic compound monomers employed in the context of our invention are those known to polymerize with organolithium initiators in solution polymerization systems. These monovinyl-substituted aromatic compounds typically contain 8 to 20 carbon atoms per molecule, more usually 8 to 14 for commercial purposes, and most preferred is styrene as the most readily commercially available monomer. Exemplary species include the presently preferred styrene, as well as 1-vinylnaphthalene, 2-vinylnaphthalene, and various alkyl, cycloalkyl, aryl, alkaryl and aralkyl derivatives thereof, such as 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and the like, alone or in admixture.

The relative amount of conjugated diene or dienes and monovinylaromatic compound or compounds employed can vary over a wide range.

In preparing rubbery polymers, the proportion of the conjugated diene versus the monovinyl substituted aromatic compound should be sufficient so as to result in a substantially rubbery or elastomeric copolymer product. There is no sharp break point as to the amount of conjugated diene versus monovinyl substituted aromatic compound that confers rubbery or elastomeric properties on the resulting copolymer, though in general at least 50 parts by weight of conjugated diene are required on an exemplary basis. Thus, for a rubbery copolymer in accordance with the process of our invention, the weight ratio of conjugated diene to monovinylaromatic compound in the monomer charge preferably would be in the range of about 50:50 to 95:5, based on 100 parts by weight of total monomers employed. Of course, mixtures of conjugated dienes as well as mixtures of monovinyl substituted aromatic compounds can be utilized.

ORGANOLITHIUM INITIATORS

Organolithium initiators employed in the process of our invention include the multifunctional and monofunctional types known for solution polymerization of the monomers as described hereinabove. The multifunctional organolithium initiators can be either specific organolithium compounds, or can be multifunctional types which are not necessarily specific compounds but rather represent reproducible compositions of regulable functionality.

The choice of initiator can be governed by the degree of branching and the degree of elasticity desired for the polymer, the nature of the feedstock, and the like. With regard to the feedstock employed as the source of conjugated diene, the multifunctional initiator types, for example, generally are preferred when a low concentration diene stream is at least a portion of the feedstock, since some components present in the unpurified low concentration diene stream may tend to react with carbon-lithium bonds to deactivate initiator activity, thus necessitating the presence of sufficient lithium functionality in the initiator so as to override such effects.

Among the multifunctional initiators, which may not necessarily be specific compounds, are those prepared by reacting an organomonolithium compound with a multivinylphosphine or with a multivinylsilane in a diluent such as a hydrocarbon or a mixture of a hydrocarbon and a polar organic compound. The reaction between the multivinylsilane or multivinylphosphine and the organomonolithium compound can result in a precipitate, which can be solubilized if desired, by adding a solubilizing monomer such as a conjugated diene or monovinylaromatic compound after reaction of the primary components. Alternatively the reaction can be conducted in the presence of a minor amount of the solubilizing monomer. Relative amounts of organomonolithium compound and multivinylsilane or multivinylphosphine preferably should be in the range of about 0.33 to 4 mols of organomonolithium compound per mol of vinyl group present in the multivinylsilane or multivinylphosphine employed.

Exemplary organomonofunctional lithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyl divinylphosphine, dodecyl divinylphosphine, phenyl divinylphosphine, cyclooctyl divinylphosphine, and the like.

Other multifunctional polymerization initiators can be prepared by utilizing an organomonolithium compound, such as described above, further together with a multivinylaromatic compound and either a conjugated diene or monovinylaromatic compound or both. These ingredients can be contacted together in a hydrocarbon or a mixture of a hydrocarbon and a polar organic compound as diluent. Alternatively, a multifunctional polymerization initiator can be prepared in a two step process by reacting an organomonolithium compound with a conjugated diene or monovinylaromatic compound and then adding the multivinylaromatic compound. The ratio of conjugated diene or monovinylaromatic compound additive employed should be in the range of about 2 to 15 mols of polymerizable compound per mol of organolithium compound. The amount of multivinylaromatic compound employed should be in the range of about 0.05 to 2 mols per mol of organomonolithium compound.

Exemplary multivinylaromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinylaromatic hydrocarbons containing up to 18 carbon atoms per molecule are preferred, particularly divinylbenzene as either the ortho, meta, or para isomer, and commercial divinylbenzene, which is a mixture of isomers, also is quite satisfactory.

Other types of multifunctional initiators can be employed, such as those prepared by contacting a sec- or tert-organomonolithium compound with 1,3-butadiene, in a ratio of such as about 2 to 4 mols of organomonolithium compound per mol of 1,3-butadiene, in the absence of added polar material in this instance, with the contacting preferably being conducted in an inert hydrocarbon diluent, though contacting without the diluent can be employed, if desired.

Alternatively, specific organolithium compounds can be employed, if desired, as initiators in the preparation of the polymers in accordance with our invention of preparing easily processable polymers. These can be represented by $R(Li)_x$ wherein R represents a hydrocarbyl radical of such as 1 to 20 carbon atoms per R group, and x is an integer of 1 to 4.

Exemplary organolithium compounds are methyllithium, isopropyllithium, n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

RANDOMIZING AGENTS

The organolithium-initiated polymerization process in accordance with our invention employs a mixture of monomers with the polymerization preferably conducted in a hydrocarbon diluent, further with a randomizing agent to substantially avoid formation of substantial block content. The randomizing agent is included in the polymerization reaction mixture. Any suitable polar organic compound known in the art for randomization can be employed for such purposes, including the hydrocarbyl ethers, thioethers, and amines. Such polar compounds, particularly the ethers such as tetrahydrofuran, tend to lead to polymers of substantial vinyl unsaturation content with respect to the portion derived from the conjugated diene monomer.

Where randomization without vinylization or with minimum vinylization is desired, then other types of randomizing compounds can be readily employed to produce low vinyl copolymers. Examples of such other types of compounds include the alkylpotassium compounds such as methylpotassium, ethylpotassium, n-propylpotassium, isopropylpotassium, tert-butylpotassium, tert-amylpotassium, n-hexylpotassium, cyclohexylpotassium, and the like.

Other suitable randomizing agents include the potassium salts of mono- and polyhydric alcohols, mono- and polyhydric phenols, including bisphenols, and sulfur analogs of same. Specific examples of such compounds include the potassium salts of methyl alcohol, ethyl alcohol, n-propyl alcohol, isopropyl alcohol, tert-butyl alcohol, tert-amyl alcohol, n-hexyl alcohol, cyclohexyl alcohol, benzyl alcohol, phenol, catechol, resorcinol, hydroquinone, pyrogallol, 1-naphthol, 2-naphthol, 2,6-di-tert-butyl-4-methylphenol, ethanethiol, 1-butanethiol, 2-pentanethiol, 2-isobutanethiol, thiophenol, 1,12-dodecanedithiol, 2-naphthalenethiol, cyclohexanethiol, 1,8-octanedithiol, 1,4-benzenedithiol, and the like. Also the potassium salts of 2,2'-methylene-bis(4-methyl-6-tert-butylphenol), 2,2'-isopropylidene-bis(6-cyclohexyl-p-cresol), and the like.

Potassium salts of mono- and polycarboxy acids and sulfur analogs can be employed such as the potassium salts of isovaleric acid, caprylic acid, lauric acid, stearic acid, oleic acid, linolenic acid, cyclopentanecarboxylic acid, phenylacetic acid, benzoic acid, azelaic acid, phthalic acid, 1,8,16-hexadecanetricarboxylic acid, 2-naphthoic acid, hexanethionic acid, thiolbenzoic acid, and the like.

Examples of suitable potassium carbonates and sulfur analogs include the potassium salts of tert-butylcarbonic acid, n-hexylcarbonic acid, 3,5-dimethylhexylcarbonic acid, n-dodecylcarbonic acid, and the like.

Examples of potassium salts of secondary amines suitable for use as randomizers include the potassium salts of dimethylamine, di-n-butylamine, methyl-n-hexylamine, di(3,5-diethyloctyl)amine, diphenylamine, dibenzylamine, and the like.

Other effective low vinyl randomizing agents are the hexaalkylphosphoramides employed which can be employed alone or in conjunction with the above potassium compounds, particularly and preferably with the potassium alkoxides. Exemplary compounds of this type include the presently preferred hexamethylphosphoramide, as well as hexaethylphosphoramide, hexa-n-propylphosphoramide, trimethyltrihexylphosphoramide, and the like.

In all references to potassium randomizers above, the equivalent sodium, cesium, or rubidium compound can be employed, though potassium compounds and particularly the potassium alkoxides are preferred for effectiveness and availability. Thus, we refer to alkali metal, other than lithium, randomizers.

Alkoxysilicon Treating Agents

Alkoxysilicon treating agents employed in the polymerization phase in the continuous process of our invention include the alkoxysilanes, disiloxanes, and disilanes, alone or in admixture.

The alkoxysilanes can be represented by $$R'_x - Si - (OR')_{4-x}$$

wherein each R' represents hydrocarbyl radical preferably containing 1 to 12 carbon atoms such that the total number of carbon atoms per molecule is about 20, and x is 0 or an integer of 1 or 2. Examples of such alkoxysilanes include dimethyldimethoxysilane, phenyltriethoxysilane, tetraethoxysilane, n-dodecyltrimethoxysilane, cyclohexyltriethoxysilane, di-n-propyldibenzyloxysilane, p-tolyltriethoxysilane, and the like, alone or mixture. Alternatively, disiloxanes containing the — Si — O — Si group, such as hexaethoxydisiloxane, and disilanes represented by

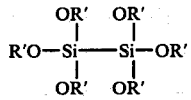

each as hexaethoxydisilane can be employed.

Polymerization Conditions

The polymerization step preferably is carried out in a hydrocarbon diluent which can be one or more aromatic, paraffinic, or cycloparaffinic compounds, preferably containing 4 to 10 carbon atoms per molecule, which is a liquid under the conditions of the process. Examples include butane, pentane, isooctane, cyclohexane, benzene, toluene, xylene, ethylbenzene, hexane, and the like, alone or in admixture.

The polymerization temperatures can vary over a broad range, for example from about −20° C. to 150° C., although a presently preferred temperature is about 30° C. to 125° C. Pressure employed should be sufficient to maintain substantially liquid phase conditions in the reaction zone.

The quantity of initiator employed can vary broadly, such as from about 0.2 to 5, preferably about 0.2 to 1.5, milliequivalents of active lithium per hundred grams monomer.

The amount of randomizer can vary widely, depending on type employed, the extent of randomization desired, as well as other factors such as control of vinylization. When employing the presently preferred randomizers based on an alkali metal M other than lithium (third to sixth period of Group I), presently preferred the potassium randomizers, a broad range can be employed such as about 0.25:1 to 100:1 atom ratio Li:M, more preferred about 5:1 to 50:1, wherein M is an alkali metal other than lithium.

When employing an alternative randomizing additive, such as a hexaalkylphosphoramide, hydrocarbyl ether, thioether, or amine, a ratio of mols of randomizer to gram atoms of lithium in the initiator in the range of about 0.2:1 to 0.01:1, preferably about 0.1:1 to 0.01:1, is exemplary.

The alkoxysilicon treating agent additives employed in the first reactor in accordance with our invention can be employed in a wide range of amount so long as it is that amount suitable and effective to result in improved product processability. An exemplary amount is in the range of about 0.1 to 2 milliequivalents of alkoxysilicon compound per 100 grams of total monomer, more preferred about 0.2 to 1, wherein one alkoxy group —OR' is considered equivalent to one lithium.

The alkoxysilicon treating agent is applied to the first reactor means, preferably as a solution or dispersion in a hydrocarbon diluent such as cyclohexane at a convenient concentration. The alkoxysilicon treating agent alternatively can be admixed with and fed with one or other of the monomers, or with the diluent streams, or separately, as may be desired or convenient.

Termination

As the polymerization reaction mixture exits the next to the last reactor means in the series, polymerization of the monomers should be substantially complete. The polymerization process is operated in such a manner that the time for polymerization is sufficient to permit substantially complete polymerization by this stage, that is, substantially complete conversion of monomers. The polymerlithium is terminated either by a conventional noncoupling type of termination such as with water, acid, lower alcohol, or the like, or by reaction with a coupling agent. The highly processable rubbery polymers produced according to our invention are organolithium initiated conjugated diene/monovinylaromatic substantially random copolymers prepared with the use of an effective amount of an alkoxysilicon treating agent in the first reactor means, and with or without coupling in the last reactor means. Coupling agents presently are employed in our preferred mode because the resulting products exhibit desirable reduction in cold flow as well as other properties. In our use of the term "coupling" as herein employed, the term is a broad term meaning the bringing together and joining by means of a central coupling atom or group of atoms of a coupling moiety, two or more of the living lithium terinated polymer chains. Thus, a difunctional coupling agent results in linear copolymers, while coupling agents with a functionality of 3 or greater result in branched polymers.

Among the suitable branching agents are the multivinylaromatic compounds, multiepoxides, multiisocyanates, multiimines, multialdehydes, multiketones, multihalides, multianhydrides, multiesters, which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons presently are preferred, particularly divinylbenzene in either its ortho, meta, or para isomer. Commercial divinylbenzene which is a mixture of isomers is quite satisfactory.

While any multiepoxide can be used, we presently prefer those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-aziridinyl)phosphine oxide, tri(2-methyl-1-aziridinyl)-phosphine oxide, tri(2-ethyl-3-decyl-1-aziridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of multiesters include diethyladipate, triethylcitrate, 1,3,5-tricarbethoxybenzene, and the like.

Among the multihalides, we presently prefer the silicon polyhalides such as the tetrahalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon halides as described hereinabove, other metal polyhalides, particularly those of tin, lead, or germanium, also can be readily employed as coupling agents.

Difunctional counterparts of these exemplary coupling agents also can be employed, whereby a linear polymer rather than a branched polymer results.

Broadly, and exemplarily, a range of about 0.01 to 4.5 milliequivalents of coupling or branching agent are employed per 100 grams of monomer, presently preferred about 0.01 to 1.5 to obtain the desired Mooney viscosity. The larger quantities tend to result in production of polymers containing terminally reactive groups or linear coupling instead of true branching. One equivalent of treating agent per equivalent of lithium is considered optimum amount for maximum branching, if this is desired in the production line. The coupling agent can be added in hydrocarbon solution, e.g., in cyclohexane, to the polymerization admixture in the final reactor with suitable mixing for distribution and reaction.

Polymer Recovery

As is commonly practiced in polymerization processes, it is preferable to add an antioxidant to the effluent from the final reactor to retard potentially deleterious effects of contact with oxygen. A typical antioxidant is 2,6-di-t-butyl-4-methylphenol, and an exemplary amount is in the range of about 0.5 to 1 part by weight per hundred parts monomers.

The polymer can be precipitated and the remaining carbon-lithium moieties, if any, inactivated by the addition of such as a lower alcohol, such as isopropyl alcohol, followed by separation of the product polymer from the polymerization diluent and residue by means such as decantation, filtration, centrifugation, or steam stripping, together with removal of volatiles at reduced pressure and moderate temperature such as about 60° C.

The polymers can be compounded with a variety of ingredients including fillers, dyes, pigments, curing or crosslinking agents, softeners, reinforcing agents, and the like, in various compounding operations.

The rubbery polymers produced in accordance with the invention have utility in applications where synthetic and natural rubbers are employed, and can be manufactured or formed into a variety of finished articles, by molding, extruding, or the like. The rubbery substantially random copolymers made in accordance with our invention have particular application as tire tread and sidewall stock.

EXAMPLES

Examples provided are intended to assist in an understanding of the invention, and are directed to those of skill in the art. Particular species employed, particular conditions, relationships, and the like, are designed to be illustrative, and not limitative.

The equipment employed in the illustrative runs comprised a three-reactor train, i.e., three reactors connected in series. Lines to the first reactor provided, by pumping from respective reservoirs, styrene, butadiene, cyclohexane, tetraethoxysilane, a cyclohexane solution of the initiator, and a cyclohexane solution of the randomizer. These reagents had been purified, prior to use, by individually appropriate techniques known to the art. The first two reactors were maintained at 100° C. by heating the feed and by heating the reactors externally. Butadiene and styrene were blended with hot cyclohexane just prior to introduction of this hot, 85–110° C., mixture into the bottom of the first reactor via a common line. The randomizer, potassium t-amyloxide, and tetraethoxysilane were delivered to the first reactor through the monomer/solvent line.

The first two reactors were stirred, 3-pint, round-bottomed glass flasks each jacketed by a water bath of controlled temperature, with each reactor equipped with a cooling coil.

The third reactor was a 15" × 2" iron pipe. The bottom cap was attached to two smaller concentric pipes with polymer solution entering through the outer and silicon tetrachloride through the inner pipe. These streams were mixed with a helical stirrer turned to force the solution downward. The pressure was allowed to drop to atmospheric, and the volatiles were vented off as the polymer solution was removed through a side-arm near the top of the pipe. A one-way valve on the effluent line prevented air from entering the third reactor.

Two continuous polymerization runs were made in accordance with the following recipe. Run 1 illustrates the optional coupling step, and Run 2 illustrates operation without coupling. Values given below applying to Reactor 3 are pertinent to the use of the optional coupling step.

| Polymerization Recipe | |
|---|---|
| Butadiene | 85 phm[1] |
| Styrene | 15 phm |
| Butenes and other light hydrocarbons[2] | 103 phm |
| Cyclohexane | 700 phm |
| Initiator[3] | variable |
| Potassium t-amyloxide | variable |
| Tetraethoxysilane | variable |
| Silicon tetrachloride | variable |
| Temperature (Reactors 1 and 2)[4] | 100° C |
| Pressure: | |
| Reactor 1 | 110 psig |
| Reactor 2 | 105 psig |
| Reactor 3 | ambient |
| Average residence time: | |
| Reactor 1 | 13 minutes |
| Reactor 2 | 13 minutes |
| Reactor 3 | 13 minutes |

[1]Parts by weight per hundred grams of monomer.

| [2] Hydrocarbon | wt. % |
|---|---|
| $C_3$ and lighter | 0.04 |
| Isobutane | 0.04 |
| n-Butane | 0.16 |
| 1-Butene | 39.4 |
| Isobutylene | 59.2 |
| trans-2-Butene | 0.29 |
| cis-2-Butene | 0.15 |
| Isoprene | 0.09 |
| Cyclohexane | 0.46 |
| Residue | 0.07 |

[3]A 1,3-butadiene solubilized multilithium initiator prepared by tumbling a mixture of 420 ml cyclohexane, 0.258 mole 1,3-butadiene, 24 mmoles of mixed isomers of divinylbenzene, and 75 mmoles n-butyllithium at 70° C. for 40 min. followed by dilution with cyclohexane to a concentration of 0.145 N based on lithium and determined by hydrolysis and titration with standard acid.

[4]The third reactor is not heated, and the temperature varies through the third reactor from an estimated 40° C. to an estimated 80° C.

Approximately 0.5 to 1 phr (parts by weight per hundred parts of rubber) of 2,6-di-t-butyl-4-methylphenol in isopropyl alcohol solution was added to the effluent of the third reactor. The polymer was coagulated in isopropyl alcohol, collected by decantation, and volatiles were removed under reduced pressure at approximately 60° C.

The polymers were individually compounded in accordance with the following recipe:

| Compounding Recipe | |
|---|---|
| | phr |
| Rubber | 100 |
| N 220[1] | 60 |
| Philrich 5[2] | 20 |
| Zinc oxide | 3 |
| Stearic acid | 2 |
| Wingstay 100[3] | 1 |
| Santoflex AW[4] | 2 |
| Sunolite 666-B[5] | 2 |
| Sulfur | 1.75 |
| Santocure NS[6] | 1.2 |

[1]Intermediate super abrasion furnace black.
[2]An aromatic oil.
[3]Mixed diaryl p-phenylene diamines.
[4]6-Ethoxy-1,2-dihydro-2,2,4-trimethylquinoline.
[5]Blend of waxy hydrocarbons.
[6]N-t-butyl-2-benzothiazolesulfenamide.

Table I below provides evaluation data for inventive runs, which illustrate respectively both the presence and the absence of the coupling step, and for control runs which were made under batch conditions.

TABLE I

Polymer Evaluation
(Values for 30 Minute Cure at 307° F.)

| Run | 1[1] Invention Coupled | 2[1] Invention Not coupled | 3[2] Control coupled | 4 Control coupled |
|---|---|---|---|---|
| Initiator, meqhm[8] | 1.4[9] | 1.5[9] | 1.5[9] | 1.4[9] |
| KO-t-$C_5H_{11}$, Li/K atom ratio | 21/1 | 22.6/1 | 25/1 | 18/1 |
| Si(OEt)$_4$, meqhm | 0.45 | 0.26 to 1.0[10] | 0 | 0 |
| SiCl$_4$, meqhm | 0.34 to 1.15[10] | 0 | 0.49 | 0.19 |
| ML-4[3], raw | 65 | 49 | 53 | 52 |
| ML-4, compounded | 48 | 42 | 56.5 | 53 |
| Band rating[4] 195/158° F | 10/10 | 10/10 | 8/2LT | 6/2LT |
| 300% Modulus, psi[5] | 1070 | 980 | 1280 | 1170 |
| Tensile, psi[5] | 2720 | 2500 | 3060 | 3050 |
| Elongation, %[5] | 570 | 540 | 530 | 550 |
| Resilience, %[6] | 56.5 | 55.2 | 62.2 | 60.8 |
| Shore hardness[7] | 58 | 58 | 62 | 62 |

[1]Blends of several samples of like Mooney viscosity from different recipes. The recipe amounts in the Table are averages of the several recipes for the parts blended.
[2]85 butadiene/15 styrene random copolymer employing a low concentration 1,3-butadiene (comprising 1-butene, 15 wt. %; isobutylene, 30 wt. %; 1,3-butadiene, 55 wt. %), a multifunctional organolithium initiator derived from divinylbenzene and n-butyllithium at a divinylbenzene/Li ratio of 0.20/1, randomized by potassium t-amyloxide, and coupled by silicon tetrachloride.
[3]ASTM D 1646-63.
[4]10 best; LT, loose on top; see Railsback, H. E., Howard, W. S., and Stumpe, Jr., N. A., RUBBER AGE 106, 46–55 (1974).
[5]ASTM D 412-66.
[6]ASTM D 945-59, Yerzley oscillograph, modified in that the specimen is a right cylinder 0.7-inch in diameter and 1-inch high.
[7]ASTM D 2240-68.
[8]Gram milliequivalents per 100 grams of total monomer.
[9]Total initiator added. Active initiator is 0.3 to 0.4 meqhm less than total due to reaction with poisons (water, etc.).
[10]See footnote (1). Range of SiCl$_4$ or Si(OC$_2$H$_5$)$_4$ used to prepare components of blend varied too much to record an average value.

The excellent mill banding characteristics of the invention polymers, Runs 1 and 2, are evident from Table I. Note that Run 1 employs the optional coupling step. The mill band rating is the property in the Table directly related to processability of the rubbers. Improved processability has thus been demonstrated according to the invention in this Example. In general, other properties can be modified as desired by adjusting the corresponding recipe.

The disclosure, including data, illustrate the value and effectiveness of our invention. The examples, the knowledge and background of the field of the invention, and general principles of chemistry and other applicable sciences have formed the bases from which the broad descriptions of the invention including the ranges of conditions and generic groups of operant components have been developed, which have formed the bases for our claims here appended.

We claim:

1. A process for preparing a rubbery substantially random copolymer which comprises polymerizing monomers selected from at least one polymerizable conjugated diene with at least one copolymerizable monovinyl-substituted aromatic compound under solution polymerization conditions of temperature, pressure, diluent, an organolithium initiator, and at least one randomizing agent in an amount sufficient to substantially randomize the copolymerization of said conjugated diene and said monovinyl-substituted aromatic compound, wherein said polymerization process is conducted as a substantially continuous polymerization process employing at least two reactor means of which the first and optionally at least one second reactor means function as polymerization reactor means and the last as a terminating reactor means, wherein said conjugated diene, said monovinylaromatic compound, said organolithium initiator, said randomizing agent, said diluent, and at least one alkoxysilicon treating agent, are added to said first reactor means to form a polymerization mixture, wherein said polymerization of said monomers is substantially complete when said polymerization mixture enters said terminating reactor means, and said random copolymer is withdrawn as product from said last reactor means, wherein said alkoxysilicon treating agent is employed in an amount effective to substantially increase the processability of said random copolymer product.

2. The process according to claim 1 wherein said conjugated diene contains 4 to 12 carbon atoms per molecule, and said copolymerizable monovinylaromatic compound contains 8 to 20 carbon atoms per molecule.

3. The process according to claim 2 wherein said conjugated diene is 1,3-butadiene, isoprene, 2,3-dimethyl-1,3-butadiene, piperylene, 3-butyl-1,3-octadiene, 2-phenyl-1,3-butadiene, or mixture; and wherein said monovinylaromatic compound is styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixture.

4. The process according to claim 3 wherein said resulting copolymer represents the copolymerization of about 95 to 50 parts by weight of said conjugated diene and 5 to 50 parts by weight of said monovinylaromatic compound.

5. The process according to claim 4 employing said alkoxysilicon treating agent in a range of about 0.1 to 2 milliequivalents per 100 grams of monomer.

6. The process according to claim 5 wherein said conjugated diene is provided, at least in part, by a low concentration diene stream.

7. The process according to claim 1 wherein said organolithium initiator is a multifunctional species or compound.

8. The process according to claim 1 wherein said organolithium initiator is represented by $R(Li)_x$ wherein R is a hydrocarbon radical of 1 to 20 carbon atoms per molecule, and x is an integer of 1 to 4.

9. The process according to claim 8 wherein said organolithium compound is selected from the group consisting of methyllithium, isopropyllithium, n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,2-dilithio-1,2-diphenylethane, 1,2-dilithio-1,8-diphenyloctane, 1,3,5,-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

10. The process according to claim 5 employing said organolithium initiator in an amount sufficient to provide about 0.2 to 5 milliequivalents of lithium per 100 grams of monomer.

11. The process according to claim 10 wherein said randomizing agent is a polar organic compound and is an ether, thioether, amine, alkali metal salt, or an alkali metal salt plus a hexaalkylphosphoramide, wherein said alkali metal is other than lithium.

12. The process according to claim 11 wherein said randomizing agent is a said alkali metal salt and is a potassium salt of an alcohol, and is employed in an amount sufficient to provide about 0.25:1 to 100:1 Li:K atom ratio.

13. The process according to claim 12 wherein said conjugated diene is butadiene, said monovinylaromatic compound is styrene, said hydrocarbon diluent comprises cyclohexane, said initiator is a 1,3-butadiene-solubilized multilithium initiator prepared from divinylbenzene and n-butyllithium, said randomizer is potassium t-amyloxide, said alkoxysilicon treating agent is tetraethoxysilane, and said polymerization reaction mixture further is terminated with silicon tetrachloride.

14. The process according to claim 13 wherein said butadiene is provided at least in part by a low concentration diene stream.

15. The process according to claim 1 further comprising the steps of terminating the polymerization with about 0.01 to 4.5 milliequivalents per 100 grams of monomer employed in said polymerization of a multivinylaromatic compound, multiepoxide, multiisocyanate, multiimine, multialdehyde, multiketone, multianhydride, multiester of a monocarboxylic acid with a polyalcohol, multihalide, or diester of a monohydric alcohol with a dicarboxylic acid.

16. The process according to claim 15 wherein said multihalide is a silicon, lead, germanium, or tin multihalide, employed in an amount sufficient to provide about 0.01 to 1.5 milliequivalents of branching agent per 100 grams of monomer.

17. The process according to claim 5 wherein said alkoxysilicon treating agent is an alkoxysilane, disiloxane, disilane, or mixture.

18. The process according to claim 17 wherein said alkoxysilicon treating agent is a said alkoxysilane represented by $R'_x$—Si—$(OR')_{4-x}$ wherein each R' is a hydrocarbyl radical of 1 to 12 carbon atoms, and x is 0, 1, or 2.

19. The process according to claim 18 wherein said alkoxysilane is dimethyldimethoxysilane, phenyltriethoxysilane, tetraethoxysilane, n-dodecyltrimethoxysilane, cyclohexyltriethoxysilane, di-n-propyldibenzyloxysilane, p-tolyltriethoxysilane, or mixture.

20. The process according to claim 17 wherein said alkoxysilicon treating agent is a disiloxane.

21. The process according to claim 20 wherein said disiloxane is hexaethoxydisiloxane.

22. The process according to claim 17 wherein said alkoxysilicon treating agent is a disilane represented by

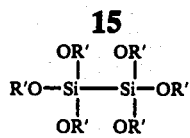
wherein each R' is a hydrocarbyl radical of 1 to 12 carbon atoms per R'.
23. The process according to claim 22 wherein said disilane is hexaethoxydisilane.
* * * * *